(12) United States Patent
Joo

(10) Patent No.: US 8,595,593 B2
(45) Date of Patent: Nov. 26, 2013

(54) NONVOLATILE MEMORY DEVICE HAVING A COPY BACK OPERATION AND METHOD OF OPERATING THE SAME

(75) Inventor: Seok Jin Joo, Seoul (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 410 days.

(21) Appl. No.: 12/606,713

(22) Filed: Oct. 27, 2009

(65) Prior Publication Data

US 2010/0162081 A1    Jun. 24, 2010

(30) Foreign Application Priority Data

Dec. 24, 2008  (KR) .......................... 10-2008-0133166
Jun. 17, 2009  (KR) .......................... 10-2009-0053838

(51) Int. Cl.
   *G06F 11/00*    (2006.01)
(52) U.S. Cl.
   USPC ............................ 714/766; 714/6.24; 714/763
(58) Field of Classification Search
   USPC ........................................................ 714/766
   See application file for complete search history.

(56) References Cited

U.S. PATENT DOCUMENTS 7,979,737 B2 *  7/2011 Lin ............................. 714/6.13
8,136,015 B2 *  3/2012 Kawai et al. ................. 714/763
2006/0117214 A1 *  6/2006 Sugiura et al. ................ 714/5
2008/0072119 A1 *  3/2008 Rozman ....................... 714/763
2009/0323417 A1 * 12/2009 Takada ..................... 365/185.09

FOREIGN PATENT DOCUMENTS

CN         1571069          1/2005
KR      1020080114208       12/2008
TW         200828330         7/2008

OTHER PUBLICATIONS

Office Action issued from the State Intellectual Property Office of the P.R.C. on May 16, 2012.
Notice of Allowance issued from Korean Intellectual Property Office on Nov. 30, 2010.

* cited by examiner

Primary Examiner — Christopher McCarthy
(74) Attorney, Agent, or Firm — IP & T Group LLP

(57) ABSTRACT

A method of operating a nonvolatile memory device comprises performing a read operation to read data stored in a first memory cell block including first unit groups; detecting a second unit group from among the first unit groups, the second unit group having a number of error bits included in the read data, which is greater than a set number of bits and equal to or smaller than a maximum allowable number of bits which can be corrected through an error checking and correction (ECC) processing; and after the second unit group is detected, performing a copyback operation for moving the data, that are stored in the first memory cell block, to a second memory cell block.

20 Claims, 4 Drawing Sheets

NONVOLATILE MEMORY DEVICE HAVING A COPY BACK OPERATION AND METHOD OF OPERATING THE SAME

CROSS-REFERENCE TO RELATED APPLICATION

This application claims priority from Korean Patent Application No. 10-2008-0133166 filed on Dec. 24, 2008 and Korean Patent Application No. 10-2009-0053838 filed on Jun. 17, 2009, the disclosure of each of which is incorporated herein by reference in their entireties.

BACKGROUND

One or more embodiments relate to a nonvolatile memory device and a method of operating the same and, more particularly, to a nonvolatile memory device and a method of operating the same, wherein an error checking and correction (ECC) processing is performed in a read operation.

A nonvolatile memory device has the property that data stored therein is retained even if the supply of power is stopped. A NAND flash memory device is one of the representative nonvolatile memory devices.

The nonvolatile memory device includes memory cells for storing data. If the degree of integration of the nonvolatile memory devices increases, the electrical properties of the nonvolatile memory devices deteriorate because the size of the memory cells decreases. For example, a memory cell having poor properties resulting from problems in the process may not properly store data in a program operation, or data stored in the memory cell may not be properly erased in an erase operation. In this case, an invalid block processing for preventing a memory cell block, including invalid memory cells, from being used is carried out.

As another example, data stored in the memory cell having poor properties is altered because of, for example, the leakage current. Furthermore, when a read operation is repeatedly performed after data is stored in memory cells, the threshold voltages of the memory cells may be changed by a pass voltage applied to the memory cells during the read operation, thereby changing data stored in the memory cells. If the data retention characteristic is degraded as described above, reliability of the device is compromised, and data stored in the device may not be read correctly.

BRIEF SUMMARY

One or more embodiments relate to a nonvolatile memory device and a method of operating the same, which is capable of improving the data retention characteristic by moving data, that are stored in a memory cell block, to a memory cell block having a more stabilized characteristic, in the case where the number of error bits generated as a result of performing an ECC processing is identical to the maximum number of error-correctable bits through the ECC processing or smaller than the maximum number of bits, but larger than the number of set bits during a read operation.

According to an aspect of this disclosure, there is provided a method of operating a nonvolatile memory device, comprising: performing a read operation to read data stored in a first memory cell block including first unit groups; detecting a second unit group from among the first unit groups, the second unit group having a number of error bits included in the read data, which is greater than a set number of bits and equal to or smaller than a maximum allowable number of bits which can be corrected through an ECC processing; and after the second unit group is detected, performing a copyback operation for moving the data, that are stored in the first memory cell block, to a second memory cell block.

A unit page included in the first memory cell block is the first unit group.

A sector in which a unit page included in the first memory cell block is divided into 2 to 8 parts is a first unit group.

The first unit group stores 512-bit or 512-byte data, 1024-bit or 1024-byte data, or 2048-bit or 2048-byte data.

The detection of the second unit group includes performing an ECC processing to correct the error bits, that are included in the read data, according to an ECC code, counting the number of error bits included in the read data, and storing whether the second unit group has been detected according to the number of error bits.

From among the first unit groups, a first unit group having a number of error bits identical to the maximum allowable number of bits or 50% greater than the maximum allowable number of bits is detected as the second unit group.

From among the first unit groups, a first unit group having a number of error bits identical to the maximum allowable number of bits or 70% greater than the maximum allowable number of bits is detected as the second unit group.

The execution of the copyback operation includes reading data by performing a read operation on a first word line included in the first memory cell block, performing an ECC processing to correct error bits included in the read data, storing the error-corrected data by performing a program operation on a first word line of the second memory cell block corresponding to the first word line of the first memory cell block, and repeatedly performing the read operation, the ECC processing, and the program operation until all data stored in the first memory cell block is stored in the second memory cell block.

When the error-corrected data is stored in the second memory cell block, an ECC code of the error-corrected data is also stored.

The method further comprises, after performing the copyback operation, performing an invalid block processing of preventing the first memory cell block from being used.

An address of the first memory cell block is stored in the nonvolatile memory device.

According to another aspect of this disclosure, there is provided a nonvolatile memory device, comprising a memory cell array comprising a number of memory cell blocks; an ECC processing unit configured to correct error bits, that are included in data read from a first memory cell block of the memory cell blocks, through an ECC processing; an invalid block processing unit configured to perform an invalid block processing for preventing the first memory cell block from being used if a number of the error bits included in the read data is greater than a set number of bits and equal to or smaller than a maximum allowable number of bits which can be corrected through the ECC processing; and a control unit configured to control a copyback operation for storing data, that are stored in the first memory cell block, to a second memory cell block.

The ECC processing unit is configured to count the number of error bits for the read data for every unit data and to detect a unit data having a number of error bits which is greater than the set number of bits and equal to or smaller than the maximum allowable number of bits.

The ECC processing unit is configured to detect a unit data having a number of error bits which is identical to the maximum allowable number of bits or 50% greater than the maximum allowable number of bits.

The ECC processing unit is configured to detect a unit data having a number of error bits which is identical to the maximum allowable number of bits or 70% greater than the maximum allowable number of bits.

The ECC processing unit is configured to set data, that are stored in the first memory cell block on a page basis, as the unit data or data, that are stored for every sector in which the page unit is divided into 2 to 8 parts, as the unit data.

The ECC processing unit is configured to set the unit data as 512 bits or 512 bytes, 1024 bits or 1024 bytes, or 2048 bits or 2048 bytes.

The ECC processing unit is configured to generate an ECC code to be stored in the second memory cell block when the copyback operation is performed.

The invalid block processing unit is configured to control an operation for storing an address of the first memory cell block in the nonvolatile memory device.

The control unit is configured to control the copyback operation for, after the data stored in the first memory cell block is corrected in the ECC processing unit, storing the data in the second memory cell block.

DESCRIPTION OF EMBODIMENTS

Figure 1A:
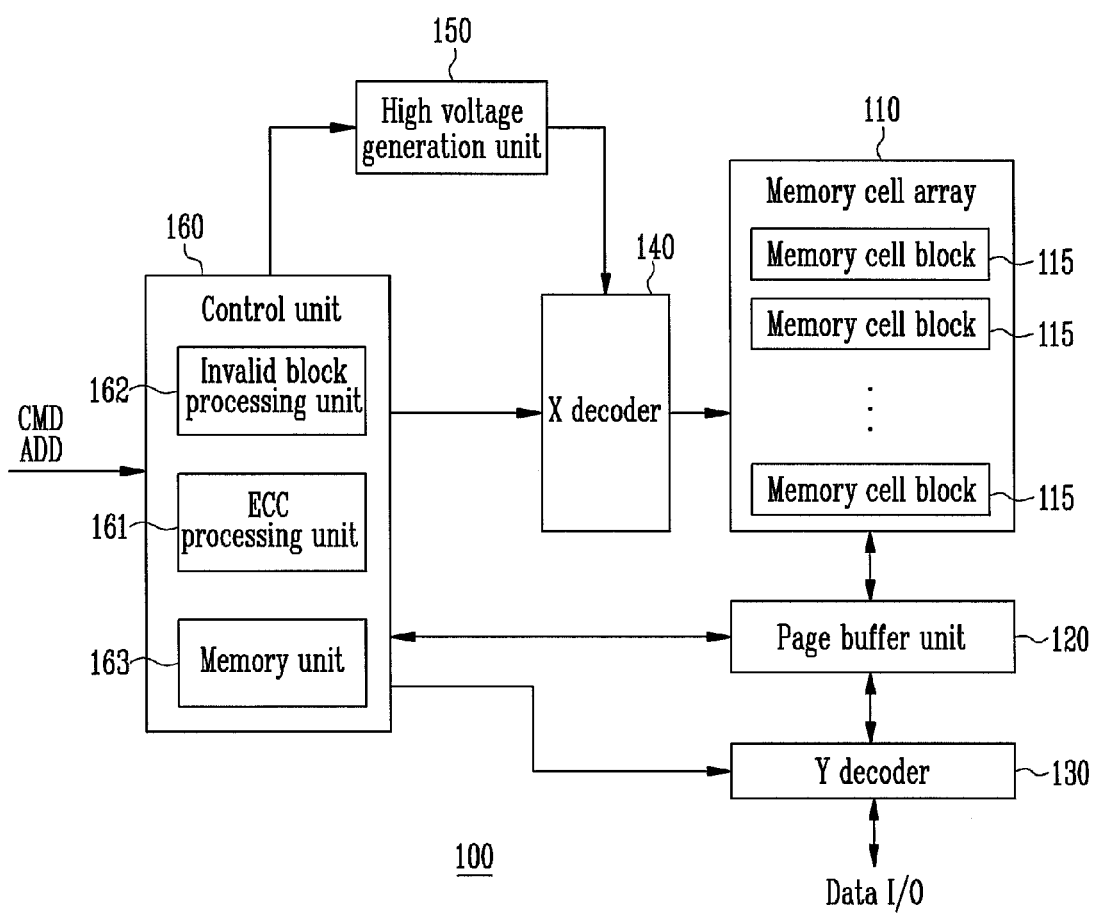
FIG. 1A is a block diagram of a nonvolatile memory device according to an embodiment.

Hereinafter, one or more embodiments of the present disclosure will be described in detail with reference to the accompanying drawings. The drawing figures are provided to allow those having ordinary skill in the art to understand the scope of the embodiment of the disclosure.

Figure 1B:
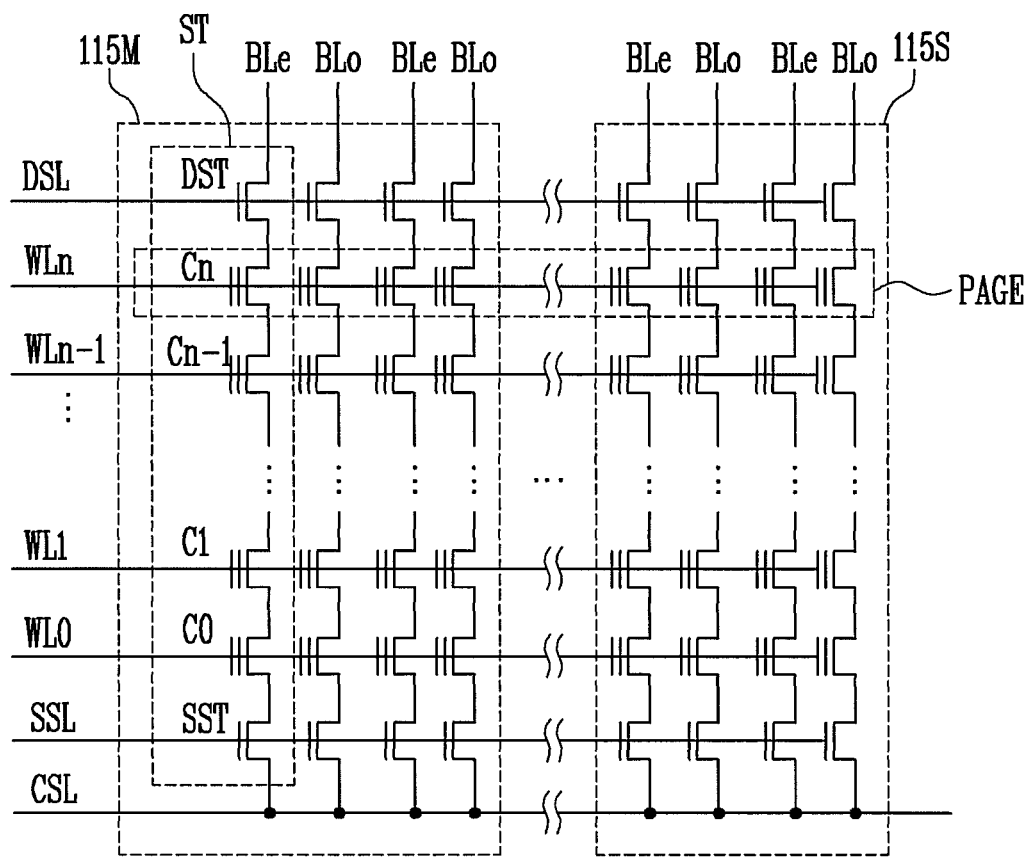
FIG. 1B is a circuit diagram of a memory cell block shown in FIG. 1A.

FIG. 1A is a block diagram of a nonvolatile memory device according to an embodiment, and FIG. 1B is a circuit diagram of a memory cell block shown in FIG. 1A.

Referring to FIGS. 1A and 1B, the nonvolatile memory device according to the present embodiment includes a memory cell array 110, a page buffer unit 120, a Y decoder 130, an X decoder 140, a high voltage generation unit 150, and a control unit 160.

The memory cell array 110 includes a number of memory cell blocks 115. Each of the memory cell blocks 115 includes a number of strings ST. Each of the strings ST includes a drain selection transistor DST, a cell string, and a source selection transistor SST. The string ST is coupled between a bit line BL and a common source line CSL. The strings ST are coupled to different bit lines BL and coupled in parallel to the common source line CSL. The cell string includes a number of memory cells C0 to Cn coupled to each other in series. The gates of the drain selection transistors DST included in different strings ST are coupled to each other, thereby forming a drain selection line DSL. The gates of the source selection transistors SST included in different strings ST are coupled to each other, thereby forming a source selection line SSL. The control gates of the memory cells included in different strings ST are coupled to each other, thereby forming word lines WL. A set of memory cells coupled to one word line WL is called a page PAGE. Furthermore, a set of even-numbered ones of memory cells coupled to one word line WL is called an even page, and a set of odd-numbered ones of memory cells coupled to one word line WL is called an odd page.

The drain selection transistor DST electrically couples the cell string to the bit line BL according to voltage applied to the drain selection line DSL. The source selection transistor SST electrically couples the cell string to the common source line CSL according to voltage applied to the source selection line SSL.

In this nonvolatile memory device, an erase operation, a program operation, and a read operation are performed according to voltage applied to the drain selection line DSL, the word lines WL, and the source selection line SSL. The erase operation is performed on each memory cell block, and the program operation or the read operation is performed on a page basis.

Meanwhile, the memory cell array 110 includes a main cell array 115M and a spare cell array 115S. The main cell array 115M includes main memory cells for storing data. The spare cell array 115S includes spare memory cells for storing information about the main memory cells. Both the main memory cells and the spare memory cells are included in each of the memory cell blocks. The main memory cells and the spare memory cells have the same configuration. In particular, during a program operation performed to store data in the main memory cells, an ECC code generated according to stored data is stored in the spare memory cells. However, the ECC code may be stored in other nonvolatile memory device not in the spare memory cells. For example, the ECC code may be stored in a memory cell block or a CAM cell for storing the status of memory cells instead of data storage. This is described in detail below.

Some of the memory cell blocks 115 included in the memory cell array 110 can be used to store information about the status of the memory cell blocks. For example, address information about an invalid memory cell block unable to store data, from among memory cell blocks, can be stored in the last memory cell block.

The control unit 160 is configured to output a program command signal, a read command signal, or an erase command signal in response to an external command signal CMD. The control unit 160 is configured to generate internal address signals in response to an address signal ADD. Furthermore, the control unit 160 is configured to output control signals to control an operation of the page buffer unit 120 during a read operation or a program operation. In particular, the control unit 160 includes an ECC processing unit 161 and an invalid block processing unit 162.

The ECC processing unit 161 is configured to generate an ECC code according to data stored in the main memory cells when a program operation is performed. The ECC code is sent to the page buffer unit 120 and stored in the spare memory cells during a program operation for storing data in the main memory cells. Furthermore, the ECC processing unit 161 is configured to compare data read from the main memory cells in a read operation and the ECC code read from the spare memory cells and correct error bits, not matching the data stored during the program operation, from among the data read during the read operation. This is called an ECC processing process. During the ECC processing process, the number of error bits included in data may be counted. For the ECC processing process, a memory unit may be included in the ECC processing unit 161, or a memory unit 163 may be included in the control unit 160 separately from the ECC processing unit 161. The memory unit 163 can be implemented using a cache memory, a register, or the like.

The invalid block processing unit 162 performs an invalid block processing function of preventing a memory cell block on which a read operation has been performed from being used according to the number of error bits included in data. Detailed operations of the ECC processing unit 161 and the invalid block processing unit 162 related to the ECC processing are described later.

The high voltage generation unit 150 is configured to generate operating voltages for a program operation, a read operation, or an erase operation in response to the program command signal, the read command signal, or the erase command signal generated by the control unit 160.

The X decoder 140 is configured to transfer the operating voltages, generated by the high voltage generation unit 150, to a memory cell block selected from among a number of the memory cell blocks 115 included in the memory cell array 110 according to an internal address generated by the control unit 160.

The page buffer unit 120 includes page buffers coupled to the bit lines BL. The page buffer may be coupled to one bit line BL or to a pair of the bit lines BL including an even bit line BLe and an odd bit line BLo. The page buffer unit 120 is configured to output data, that are read from memory cells during a read operation, to the outside in response to a control signal generated by the control unit 160, or transfer external input data to the memory cell array 110 during a program operation. Since the memory cell array 110 is divided into the main memory cell array 115M and the spare memory cell array 115S, the page buffers included in the page buffer unit 120 can be divided into page buffers for the main memory cell array 115M and page buffers for the spare memory cell array 115S.

The Y decoder 130 is configured to sequentially output data, that are read from the main memory cells and stored in the page buffer unit 120, to the outside or transfer external input data to the page buffer unit 120. As another example, in the case where data is transferred from the outside to a chip via the control unit 160, the Y decoder 130 functions to sequentially output data, that are read from the main memory cells and stored in the page buffer unit 120, to the control unit 160 and data, that are received from the control unit 160, to the page buffer unit 120. The Y decoder 130 may operate according to a column address, and the column address may be generated by the control unit 160.

A method of operating the nonvolatile memory device configured as above is described below.

Figure 2:
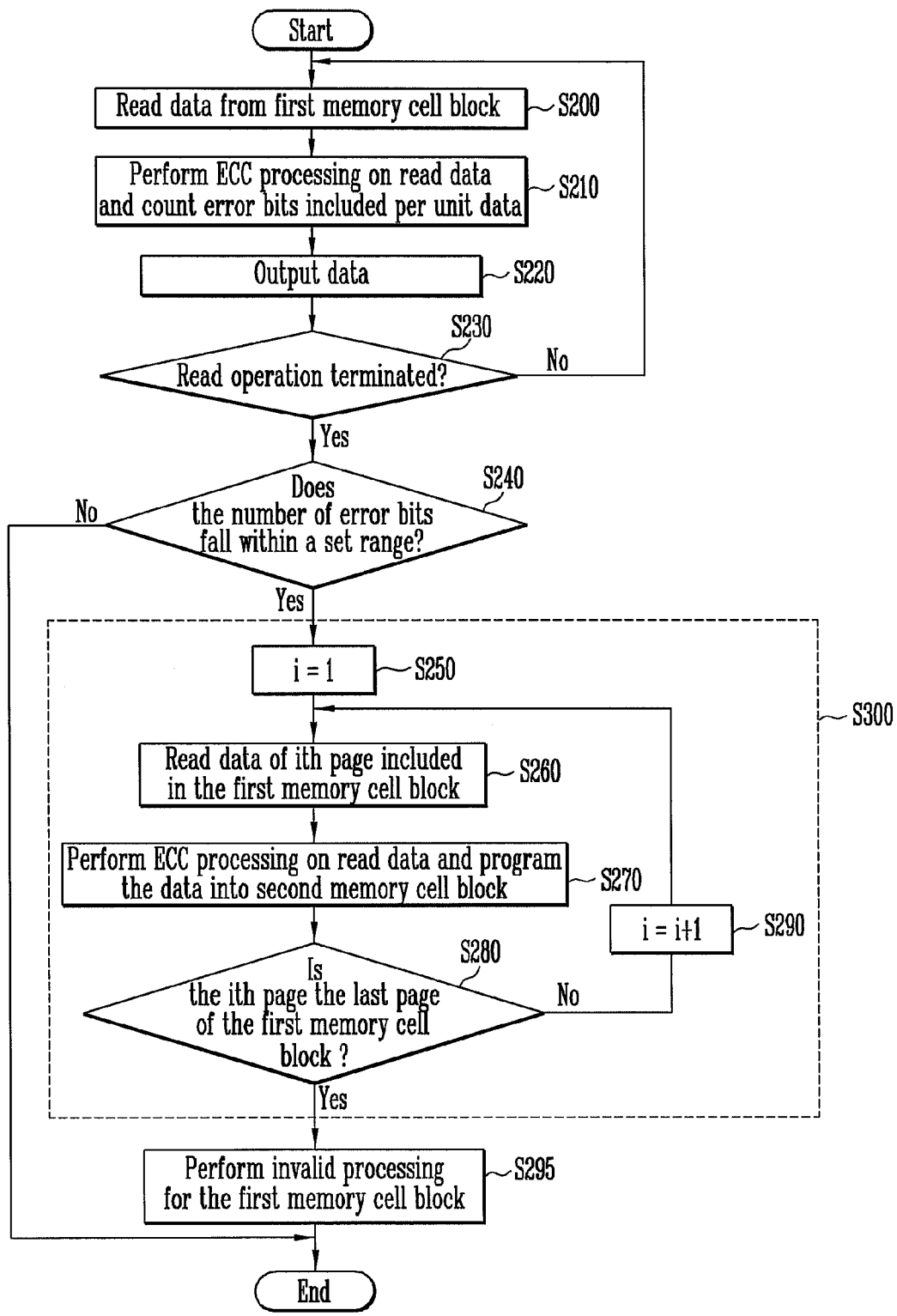
FIG. 2 is a flowchart illustrating a method of operating the nonvolatile memory device according to an embodiment.

FIG. 2 is a flowchart illustrating a method of operating the nonvolatile memory device according to an embodiment.

Referring to FIGS. 1A, 1B, and 2, a read operation is performed on a memory cell block (hereinafter referred to as a 'first memory cell block') selected from among the memory cell blocks in response to an address signal at step S200. In more detail, the read operation is performed on memory cells coupled to a word line WL selected from among a number of the word lines WL included in the first memory cell block. Assuming that 2048 memory cells are coupled to the selected word line WL, the 2048 memory cells may form one page. Furthermore, 1024 even memory cells can form an even page, and 1024 odd memory cells can form an odd page. The read operation is performed on a page basis. A case where 2048 memory cells form one page is described as an example. Data read from the memory cells of a selected page is stored in the page buffer unit 120. At this time, not only data read from main memory cells, but an ECC code read from spare memory cells are stored in the page buffer unit 120.

An ECC processing for the read data is performed at step S210. The data and the ECC code stored in the page buffer unit 120 are sent to a cache memory included in the ECC processing unit 161 of the control unit 160. The ECC processing unit 161 checks whether the data read from the main memory cells is identical to actual data stored in the main memory cells when a previous program operation is performed based on the ECC code. If, as a result of the check, partial error bits exist in the read data, the ECC processing unit 161 corrects the error bits.

Furthermore, the ECC processing unit 161 counts the number of error bits. An operation for counting the number of error bits may be executed apart from the ECC processing. Here, in circumstances in which the operation for counting the number of error bits is not required, the speed of the ECC processing operation can be improved. Furthermore, during the ECC processing operation, count for the number of error bits and correction for the error bits can be performed at the same time. In this case, since the operation for counting the number of error bits need not to be performed separately, the operation speed in circumstances in which a counting operation is performed can be improved.

The number of error bits that can be corrected through the ECC processing is limited for every unit data. For example, the number of error-correctable bits can be limited for every unit group (a page, or a sector in which a page is divided into 2 to 8 parts) within the first memory cell block. In more detail, 128, 64, or 32 error bits can be corrected for every 4096-bit (or 4096-byte) data, 32 error bits can be corrected for every 2048-bit (or 2048-byte) data, 16 error bits can be corrected for every 1024-bit (or 1024-byte) data, or 8 error bits can be corrected for every 512-bit (or 512-byte) data. This setting may vary according to the design. A case where 8 error bits can be corrected for every 512-bit data is described as an example.

Assuming that 2048 main memory cells are included in one page, 2048-bit data is read through one read operation and transferred to the ECC processing unit 161. The 2048-bit data is divided into four sectors (512 bits per sector) and stored in the cache memory of the ECC processing unit 161. Error bits are corrected and counted for every sector (512 bits) through an ECC processing operation. Data whose error bits have been corrected, from among the data stored in the cache memory, is sent to the page buffer unit 120 again.

Even if not shown in the drawings, if the number of error bits existing in any one of the four sectors is greater than the number of error bits that can be corrected through the ECC processing, a corresponding memory cell block is treated as being invalid.

The error-corrected data through the ECC processing is output through the Y decoder 130 at step S220.

It is then determined whether the read operation has been performed on all pages included in the first memory cell block at step S230. If, as a result of the determination, the read operation is determined not to have been performed on all of the pages, the read operation is performed on a next page according to the above-described operations (steps S200, S210, and S220).

If error bits are detected during the ECC processing operation (step S210), it is determined whether the number of error bits falls within a set range at step S240. For example, it is determined whether the pages of the memory cell block on which the read operation has been performed include a sector having the number of error bits which is identical to the maximum number of error bits that can be corrected or smaller than the maximum number of error bits that can be corrected, but greater than the set number of error bits. In more detail, it is determined whether a sector, having the number of error bits which is identical to the number of error bits that can be corrected (i.e., 8) or a number of error bits which is greater than or equal to 4 but smaller than the number of error bits that can be corrected (i.e., 8), exists in the 512-bit sector. If, during the read operation, there is a sector satisfying the above condition, the ECC processing unit 161 stores a determination result in the cache memory during the ECC processing.

It may be determined as described above that the number of error bits generated per sector is 4 to 8. Alternatively, it may be determined whether a sector, having the number of error bits which is 50% or 70% greater than the maximum allowable number of error bits, exists. This setting range may vary according to the design.

If, as a result of the determination at step S240, a sector having the number of error bits falling within the set range is determined to exist, a copyback operation is performed on a memory cell block including the corresponding sector at step S300. This process is described in detail below.

After the read operation on the first memory cell block is terminated or the read operation on all of the memory cell blocks is terminated, a copyback operation for moving data, that are stored in the first memory cell block, to another memory cell block (hereinafter referred to as a 'second memory cell block') without stored data is performed at steps S250, S260, S270, S280, and S290. For example, a first word line can be selected at step S250, and a read operation can be performed on the selected word line at step S260. During the read operation, the above-described ECC processing is carried out in the same manner, thereby correcting error bits. The error-corrected data through the ECC processing is stored in the page buffer unit 120. Here, the ECC processing unit 161 generates an ECC code according to the error-corrected data stored in the page buffer unit 120 and sends the ECC code, together with the error-corrected data, to the page buffer unit 120. In this case, the ECC code is not newly created at the time, but the ECC code stored in the spare cells of the first memory cell block may be used.

The error-corrected data and the ECC code stored in the page buffer unit 120 are stored in main memory cells and spare memory cells of a word line (the first word line) of the second memory cell block corresponding to the word line of the first memory cell block on which the read operation has been performed through a program operation at step S270. Here, the purpose of storing the ECC code is to correct error bits occurring in a subsequent read operation of the second memory cell block in which data is stored by the copyback operation.

It is then determined whether the word line on which the read operation has been performed is the last word line of the first memory cell block at step S280. If, as a result of the determination, the word line is determined not to be the last word line of the first memory cell block, an address of the word line on which the read operation has been performed is increased in order to select a next word line at step S290. The read operation (S260) and the program operation (S270) are performed on the selected word line according to the increased address of the word line until the last word line is selected.

After the read operation for the last word line and the program operation for copyback are completed, an operation for treating the first memory cell block on which the read operation has been performed as an invalid block is executed at step S295. The invalid block processing operation (S295) is optional and may be selectively performed according to the design in the case where it is determined that reliability is compromised, such that the number of error bits abruptly rises.

The control unit 160 controls an operation for storing the address of the first memory cell block. For example, when the invalid block processing unit 162 generates a signal for an invalid block processing for the first memory cell block, the control unit 160 stores an address of the first memory cell block in a nonvolatile memory device, such as a CAM cell. In another example, the control unit 160 may control the high voltage generation unit 150, the X decoder 140, and the page buffer unit 120 so that the address of the first memory cell block is stored in a memory cell block (e.g., the last memory cell block) for storing status information, from among the memory cell blocks 115 of the memory cell array 110. The corresponding memory cell block is not used for subsequent data storage purposes because of the block address stored in the nonvolatile memory device as described above.

In the above, the reason why, even when the number of error bits occurred is smaller than the maximum number of error bits that can be corrected, the data stored in the corresponding memory cell block is stored in another memory cell block through a copyback operation and the corresponding memory cell block is then set as an invalid block is described below. If the number of error bits occurred is smaller than the number of error bits that can be corrected, a normal read operation is possible through an ECC processing. However, if the number of error bits occurred is almost the same as the maximum number of error bits that can be corrected and error bits are additionally generated because of a reduction in the data retention characteristic resulting from the leakage current, it makes it impossible to correct the error bits through an ECC processing. Accordingly, before this problem occurs, when it is possible to correct the error bits through the ECC processing, data is moved to a memory cell block having a more stabilized characteristic, and an invalid block processing for a corresponding memory cell block is performed. Reliability characteristics obtained through this operation are described below.

Figure 3:
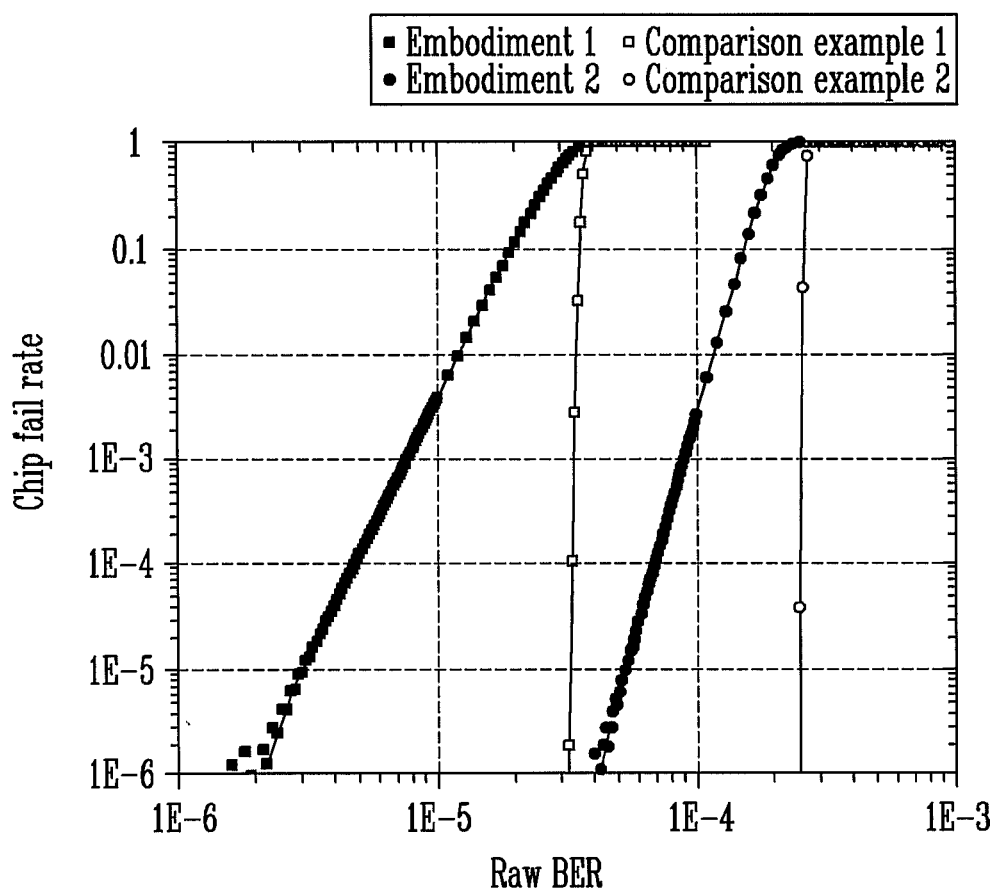
FIG. 3 is a graph showing a chip fail rate and a raw bit error rate (BER) of blocks according to embodiments 1 and 2 of this disclosure and blocks according to comparison examples 1 and 2.

FIG. 3 is a graph showing a chip fail rate and a raw bit error rate (BER) of blocks according to embodiments 1 and 2 of this disclosure and blocks according to comparison examples 1 and 2. Here, the raw BER refers to the BER that is actually generated when the ECC method is not performed.

Referring to FIG. 3, in the embodiment 1 of this disclosure, error correction is performed using an ECC method, and, if 4 error bits are included in the unit data 512 bytes, data stored in a corresponding block is programmed into another block according to the method of operating the nonvolatile memory device in accordance with this disclosure, and the corresponding block is treated as being invalid. Furthermore, in the embodiment 2 of this disclosure, error correction is performed through an ECC method, and, if 8 error bits are included in the unit data 512 bytes, data stored in a corresponding block is programmed into another block according to the method of operating the nonvolatile memory device in accordance with this disclosure, and the corresponding block is treated as being invalid. Furthermore, in the comparison example 1 of this disclosure, error correction is performed through an ECC method, but a corresponding block is not treated as being invalid. Also, in the comparison example 2 of this disclosure, error correction is performed through an ECC method, but a corresponding block is not treated as being invalid.

From FIG. 3, it can be seen that, in the embodiments of this disclosure, an allowable raw BER is increased almost ten times as compared with the comparison examples. Furthermore, in the case of 3.2E-5 BER (i.e., the chip fail rate is 70%)

when an invalid block processing is not performed, if an invalid block processing is performed, the chip fail rate can be reduced to 1E-6 or less.

According to this disclosure, after an ECC processing is performed during a read operation, when a copyback operation and an invalid block processing are performed, the following advantages can be obtained.

In a program operation, in the case where the number of invalid memory cells in which data cannot be stored is not large within one page (or one of sectors included in one page), the program operation is terminated on the assumption that error bits will be corrected through an ECC processing in a read operation. Thus, the speed of the program operation can be improved. Furthermore, even if the number of invalid memory cells is large in a program operation, data stored in a corresponding memory cell block has only to be stored in another memory cell block. Accordingly, data is not lost.

However, with the repetition of a read operation after the program operation, the data retention characteristic can be lowered because of stress applied to memory cells, and data stored in the memory cells can be altered, thereby resulting in occurrence of additional error bits. In this case, the stored data may not be recovered because of a loss.

Accordingly, as in this disclosure, during a read operation, in the case where the number of error bits generated per unit group (a page or a sector within a page) within a memory cell block is identical to the maximum number of error bits that can be corrected through an ECC processing or smaller than the maximum number of bits, but greater than the set number of bits, a copyback operation for moving data, that are stored in the corresponding memory cell block, to another memory cell block is performed, and an invalid block processing for preventing the corresponding memory cell block from being used is then performed. After the number of error bits generated falls within the number of error bits that can be corrected through an ECC processing, if additional error bits are generated, the ECC processing may become impossible. Accordingly, before the ECC processing is impossible, data is moved to a memory cell block having a more stabilized characteristic.

Accordingly, a problem that data is lost because error bits are increased due to a reduction in the data retention characteristic and so an ECC processing is made impossible can be prevented.

Furthermore, in this disclosure, an invalid block processing that is not typically performed in a read operation is selectively performed. Accordingly, the data loss rate can be reduced, and reliability of a device can be improved.

What is claimed is:

1. A method of operating a nonvolatile memory device, the method comprising:
    performing a read operation to read data stored in a first memory cell block having a plurality of pages and including first unit groups;
    detecting a second unit group having a plurality of error bits included in the data from among the first unit groups after the read operations of all of the plurality of pages included in the first memory cell block are performed, wherein the second unit group includes the number of error bits being greater than a set number of bits and being equal to or smaller than a maximum allowable number of bits which are corrected through an error checking and correction (ECC) processing; and
    performing a copyback operation for moving the data, that are stored in the first memory cell block, to a second memory cell block after the second unit group is detected.

2. The method of claim 1, wherein a unit page included in the first memory cell block is the first unit group.

3. The method of claim 1, wherein a sector in which a unit page included in the first memory cell block is divided into 2 to 8 parts is the first unit group.

4. The method of claim 1, wherein the first unit group stores 512-bit or 512-byte data, 1024-bit or 1024-byte data, or 2048-bit or 2048-byte data.

5. The method of claim 1, wherein the detecting the second unit group includes: performing an ECC processing to correct the error bits, that are included in the read data, according to an ECC code; counting the number of error bits included in the read data; and storing whether the second unit group has been detected according to the number of error bits.

6. The method of claim 1, wherein the number of error bits from among the first unit group, which is equal to the maximum allowable number of bits or 50% greater than the maximum allowable number of bits, is detected as the second unit group.

7. The method of claim 1, wherein the number of error bits from among the first unit group, which is equal to the maximum allowable number of bits or 70% greater than the maximum allowable number of bits, is detected as the second unit group.

8. The method of claim 1, wherein the performing the copyback operation includes:
    reading data by performing a read operation on a first word line included in the first memory cell block;
    performing an ECC processing to correct error bits included in the read data;
    storing the error-corrected data by performing a program operation on a first word line of the second memory cell block corresponding to the first word line of the first memory cell block; and
    repeatedly performing the read operation, the ECC processing, and the program operation until all data stored in the first memory cell block is stored in the second memory cell block.

9. The method of claim 8, wherein, when the error-corrected data is stored in the second memory cell block, an ECC code of the error-corrected data is also stored.

10. The method of claim 1, further comprising; performing an invalid block processing of preventing the first memory cell block from being used after performing the copyback operation.

11. The method of claim 10, wherein an address of the first memory cell block is stored in the nonvolatile memory device.

12. A nonvolatile memory device, comprising:
    a memory cell array comprising a number of memory cell blocks having a plurality of pages;
    an error checking and correction (ECC) processing unit configured to correct error bits, that are included in data read from a first memory cell block of the memory cell blocks, through an ECC processing;
    an invalid block processing unit configured to perform an invalid block processing for preventing the first memory cell block from being used if the number of the error bits included in the data is greater than a set number of bits and is equal to or smaller than a maximum allowable number of bits which are corrected through the ECC processing after read operations of all of the plurality of pages included in the first memory cell block are performed; and
    a control unit configured to control a copyback operation for storing data, that are stored in the first memory cell block, to a second memory cell block.

13. The nonvolatile memory device of claim 12, wherein the ECC processing unit is configured to count the number of error bits for the data for every unit data and to detect a unit data having a number of error bits which is greater than the set number of bits and is equal to or smaller than the maximum allowable number of bits.

14. The nonvolatile memory device of claim 13, wherein the ECC processing unit is configured to detect a unit data having a number of error bits which is equal to the maximum allowable number of bits or 50% greater than the maximum allowable number of bits.

15. The nonvolatile memory device of claim 13, wherein the ECC processing unit is configured to detect a unit data having a number of error bits which is equal to the maximum allowable number of bits or 70% greater than the maximum allowable number of bits.

16. The nonvolatile memory device of claim 13, wherein the ECC processing unit is configured to set data, that are stored in the first memory cell block on a page basis, as the unit data or data, that are stored for every sector in which the page unit is divided into 2 to 8 parts, as the unit data.

17. The nonvolatile memory device of claim 13, wherein the ECC processing unit is configured to set the unit data as 512 bits or 512 bytes, 1024 bits or 1024 bytes, or 2048 bits or 2048 bytes.

18. The nonvolatile memory device of claim 12, wherein the ECC processing unit is configured to generate an ECC code to be stored in the second memory cell block when the copyback operation is performed.

19. The nonvolatile memory device of claim 12, wherein the invalid block processing unit is configured to control an operation for storing an address of the first memory cell block in the nonvolatile memory device.

20. The nonvolatile memory device of claim 12, wherein the control unit is configured to control the copyback operation for, after the data stored in the first memory cell block is corrected in the ECC processing unit, storing the data in the second memory cell block.

* * * * *